United States Patent [19]

Farrier

[11] Patent Number: 5,064,090
[45] Date of Patent: Nov. 12, 1991

[54] BUCKETS

[76] Inventor: Lee M. Farrier, 39 Orchard Way, Sutton Surrey, United Kingdom

[21] Appl. No.: 604,209

[22] Filed: Oct. 29, 1990

[30] Foreign Application Priority Data

Nov. 3, 1989 [GB] United Kingdom ............... 8924858

[51] Int. Cl.⁵ ............................................. B65D 25/00
[52] U.S. Cl. ..................................... 220/482; 248/210
[58] Field of Search ..................... 220/482, 90, 85 H; 248/210, 211

[56] References Cited

U.S. PATENT DOCUMENTS

| | | | |
|---|---|---|---|
| 1,858,656 | 5/1932 | Batherman | 220/482 X |
| 2,560,398 | 7/1951 | Tims | 220/90 |
| 2,837,305 | 6/1958 | Andren | 248/148 |
| 2,911,133 | 11/1959 | Ruggieri | 220/482 X |
| 3,163,332 | 12/1964 | Boyle et al. | 220/482 X |
| 3,252,613 | 5/1966 | McGrath | 220/90 |
| 4,310,134 | 1/1982 | Schopp et al. | 248/210 |

FOREIGN PATENT DOCUMENTS

| | | |
|---|---|---|
| 485781 | 11/1948 | Belgium . |
| 440591 | 12/1967 | Fed. Rep. of Germany . |
| 779845 | 4/1935 | France . |
| 1076703 | 7/1967 | United Kingdom . |
| 2093516 | 9/1982 | United Kingdom . |

*Primary Examiner*—Steven M. Pollard
*Attorney, Agent, or Firm*—Nixon & Vanderhye

[57] ABSTRACT

The present invention provides a bucket having a base and a side wall extending therefrom, and a clip member mounted adjacent the base or the top, or both, and adapted to hook on to a bar such as a roof batten or ladder rung to retain the bucket in position on a sloping surface such as a roof or a ladder so as to be convenient for a person working on that roof or ladder.

10 Claims, 4 Drawing Sheets

BUCKETS

BACKGROUND OF THE INVENTION

This invention relates to a bucket particularly but not exclusively for use in carrying material on a roof or on a ladder.

When a person is working on a roof to tile it or repair it in some way it is often necessary for that person to have with them a bucket to carry materials such as cement or mortar, or small loose items such as nails. A conventional bucket will not rest easily on the slope of a roof and must be wedged or otherwise supported to be of any use.

It is an object of the present invention to provide a bucket which is adapted for more convenient use in such circumstances.

SUMMARY OF THE INVENTION

Accordingly the present invention provides a bucket having a base and a side wall extending therefrom, and a clip member permanently mounted on the side wall of the bucket and adapted to hook over a generally horizontal bar, such as a roof baton or a ladder rung, to retain the bucket in a position on a sloping surface, such as a roof or ladder, resting on that surface.

Preferably the clip member is movably mounted on the bucket so that it may drop to an operative position to hook over the bar, or retract to allow the base of the bucket to rest flat on a flat surface.

Preferably the clip member comprises a blade portion adapted to hook onto the bar and a slide portion which is slidably mounted on the bucket.

BRIEF DESCRIPTION OF THE DRAWINGS

In order to promote a fuller understanding of the above and other aspects of the present invention some embodiments will now be described by way of example only with reference to the accompanying drawings in which.

DESCRIPTION OF PREFERRED EMBODIMENT

Figure 1:
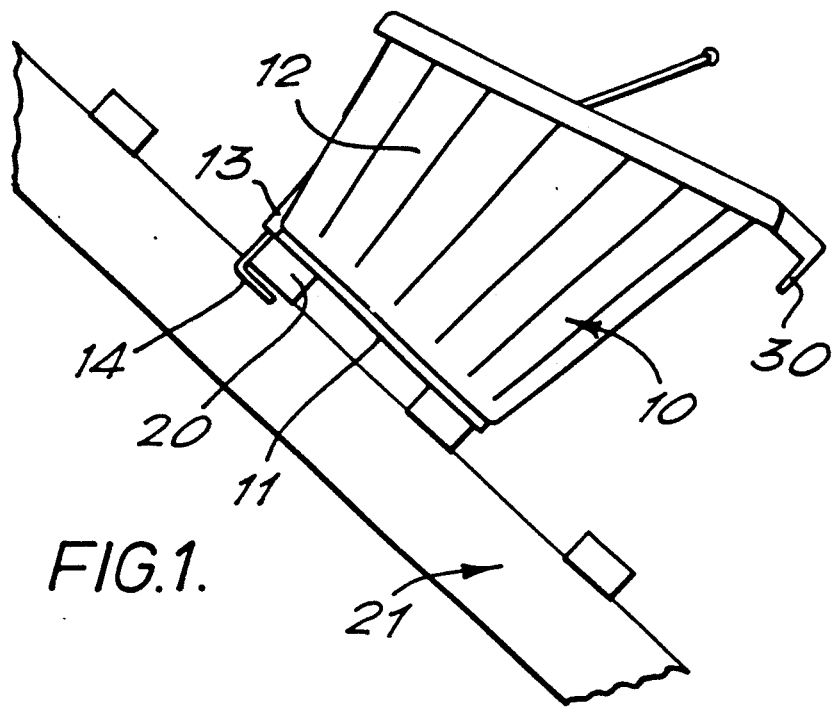
FIG. 1 is a schematic side elevation of a bucket embodying the invention, lying on its base on a sloping roof.

FIG. 1 of the drawing shows a bucket 10 comprising a base and a side wall 12. An apertured block 13 is formed in or on the side wall 12 adjacent the base 11, to slidably mount a clip member 14 on the bucket. The clip member 14 comprises a slide portion 15 arranged to slide through an aperture 16 in the block 13 and a blade portion 17. The slide portion and the blade portion 17 are disposed at substantially right angles to one another. The slide portion 15 is retained in the block 13 by an abutment member 18 in the form of a cross piece or rib at the upper end of the slide member 15. As may be seen in FIG. 3, the abutment 18 is in the form of a downwardly facing, hooked portion formed on the slide portion 15, to co-operate with a correspondingly upwardly facing hooked portion 18a, formed in the side wall of the bucket. A recess 19 is formed in the side wall of the bucket to accommodate the slide portion 15 when the clip member is in a retracted position.

In use the clip member 14 hooks on to a generally horizontal bar, in this case one of the battens 20 of a sloping roof structure 21. Thus it can be seen that the bucket 10 can then rest with its base 11 on the sloping surface generally formed by the roof and the other battens 20 and is retained in that position by the clip member 15. Thus in use, the bucket 10 can be easily moved about the roof and clipped in position to be conveniently available to carry materials to someone working on the roof.

As the slide member 15 is slidable through the block 13, when the bucket is removed from the situation shown in FIG. 1, it can be put down and rest on a horizontal surface with the clip member retracting through the block 13 to lie with the blade 17 beneath the bucket when it is on such a horizontal surface. When the bucket is again lifted up the clip member will drop through the block 13 to be in its operative position again ready to hook on to a retaining item.

It will be appreciated that the bucket and clip member can equally hook on to a generally horizontal bar in the form of a rung of a ladder with the other rungs or stiles of the ladder then forming the sloping surface on which the base of the bucket will rest in use.

The upper rim of the bucket is preferably angled as indicated in FIG. 1 so that it is more nearly horizontal when the bucket is in position on a sloping surface.

Figure 2:
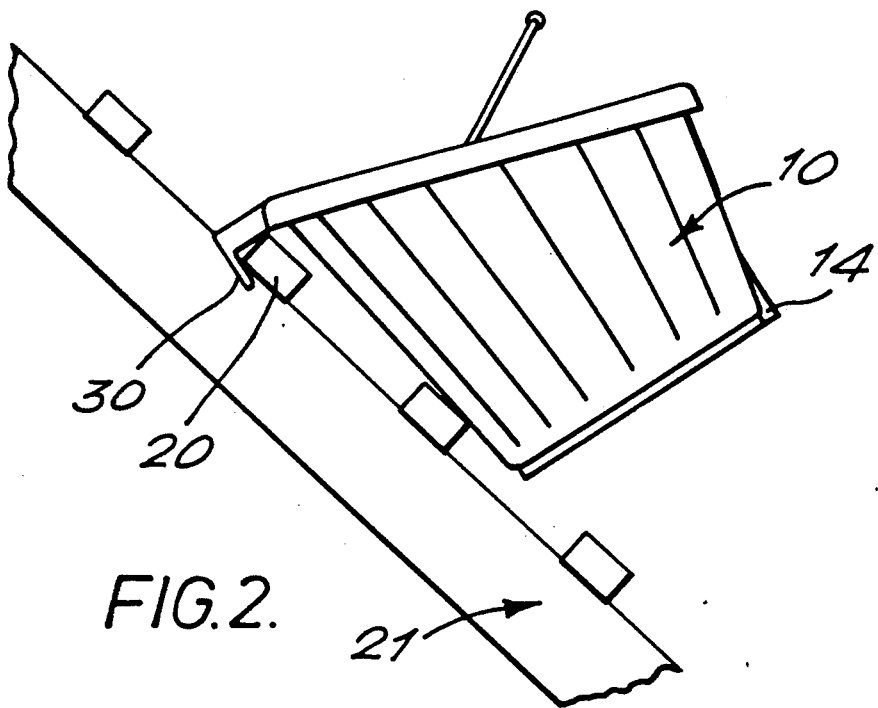
FIG. 2 shows the embodiment of FIG. 1 lying on its side on a sloping roof.

FIG. 2 of the drawings shows an alternative use of the embodiment of the invention in which a further, fixed, clip member 30 which is formed on side wall 12 adjacent the top of the bucket 10, is used to retain the bucket on a roof. If desired the bucket may be provided with only one of the clip members 14 or 30 in the positions discussed above with reference to FIG. 1 and FIG. 2.

Figure 3:
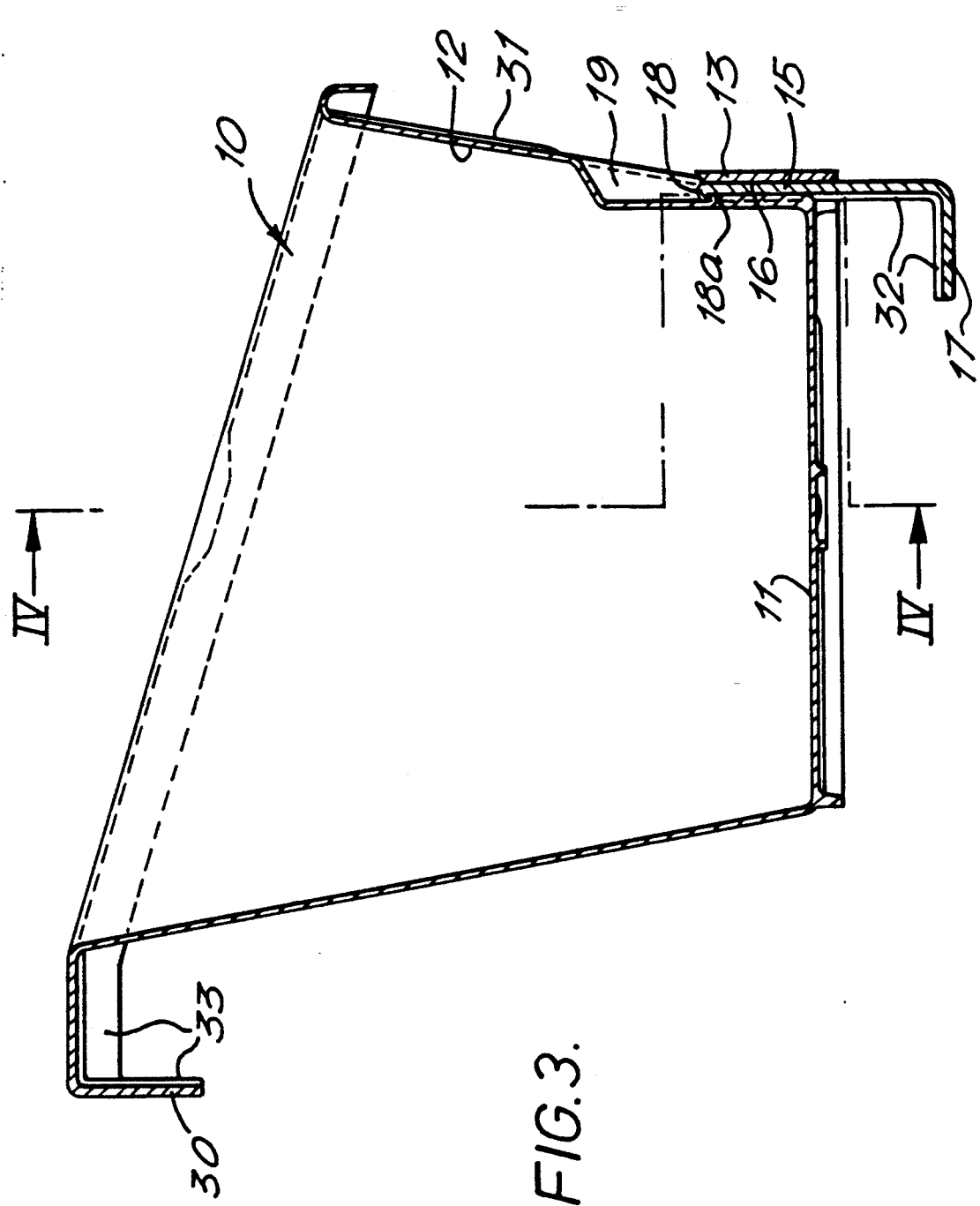
FIG. 3 shows a cross-sectional side elevation of the bucket of FIG. 1.
Figure 4:
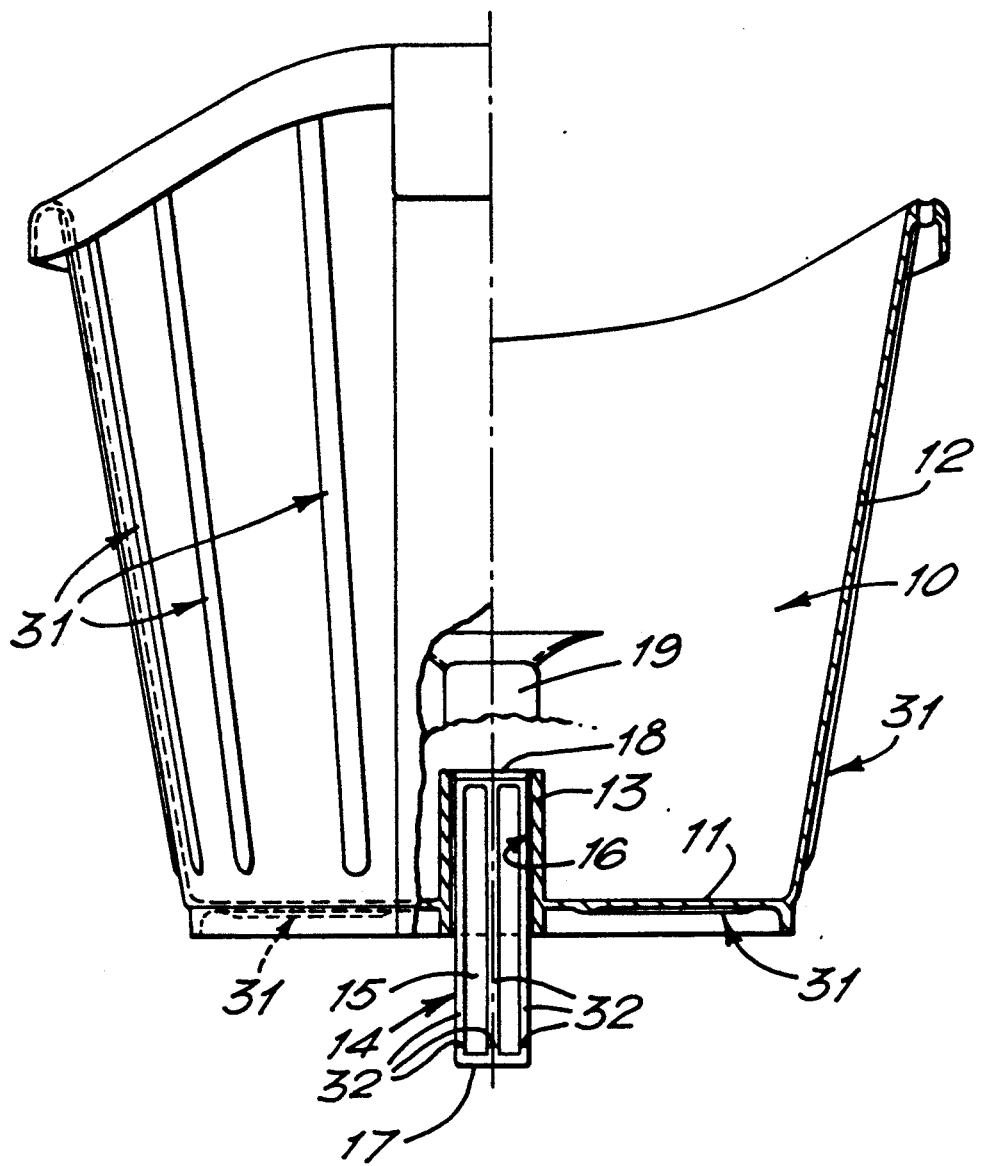
FIG. 4 shows a part sectional view on the line IV—IV of FIG. 3.
Figure 5:
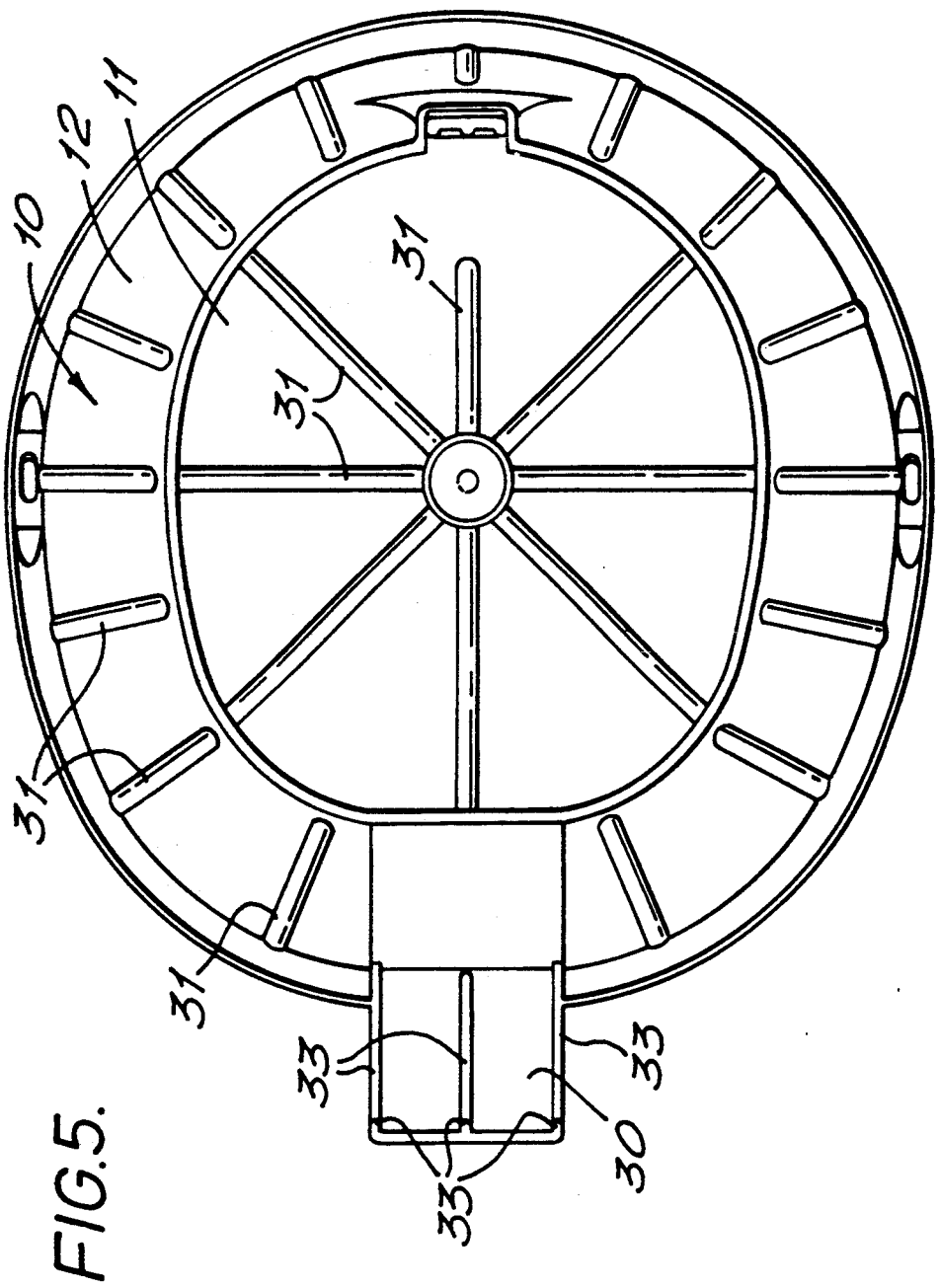
FIG. 5 shows a bottom view of the bucket of FIG. 3, with the lower hook omitted.

As can be seen in more detail in FIGS. 3, 4 and 5, the bucket 10 is preferably formed as a synthetic plastics material moulding. The side wall and base are formed with reinforcing ribs as indicated generally at 31.

The clip member 14 is also preferably formed as a synthetic plastics material moulding, and the slide portion 15 and the blade portion 17 are formed with reinforcing ribs 32. The slide portion 15, as discussed, slides in a correspondingly shaped aperture or passage 16 in the block 13 formed in or on the side wall of the bucket. The bottom wall of the bucket is held clear of the ground, when the bottom of the bucket is resting on the ground, by means of a peripheral ridge 32; and the blade portion 17 of the clip member rests within that ridge when the clip member is in its retracted position.

The further, fixed, clip member 30 is formed integrally with the upper edge of the side wall of the bucket, as best seen in FIGS. 3 and 5, and includes reinforcing ribs 33. The further clip member 30 is preferably diametrically opposite the first clip member 14.

I claim:

1. A bucket having a base and a side wall extending therefrom, and a first clip member permanently mounted on the side wall of the bucket adjacent to the base of the bucket and adapted to hook over a generally horizontal bar, such as a roof baton or a ladder rung, to retain the bucket in a position on a sloping surface, such as a roof or ladder, with its base resting on that surface.

2. A bucket as claimed in claim 1, in which the first clip member is movably mounted on the bucket so that it may drop to an operative position to hook over such bar, or retract to allow the base of the bucket to rest flat on a flat surface.

3. A bucket as claimed in claim 1 including a further clip member which is mounted adjacent the top of the bucket to retain the bucket with its side wall resting on the sloping surface.

4. A bucket as claimed in claim 3, in which said further clip member is disposed diametrically opposite said first clip member.

5. A bucket as claimed in claim 1, in which said first clip member comprises a blade portion to hook on to such bar and a slide portion slidably mounted on the bucket.

6. A bucket as claimed in claim 5 in which an apertured block is provided in or on the side wall of the bucket and the slide portion of the first clip member slides through the apertured block, and is provided with an abutment member to prevent it sliding out of the block beyond its operative position.

7. A bucket as claimed in claim 5, in which the blade portion and the slide portion are disposed substantially at right angles to each other.

8. A bucket as claimed in claim 5, in which said first clip member is formed as a synthetic plastics material moulding.

9. A bucket as claimed in claim 1, in which the rim of the bucket is sloped relative to the base.

10. A bucket as claimed in claim 1, formed as a synthetic plastics material moulding.

* * * * *